G. SPALDING.
FRAME FOR TILLING MACHINES.
APPLICATION FILED DEC. 30, 1908. RENEWED MAR. 1, 1911.
991,461.
Patented May 2, 1911.
3 SHEETS—SHEET 1.
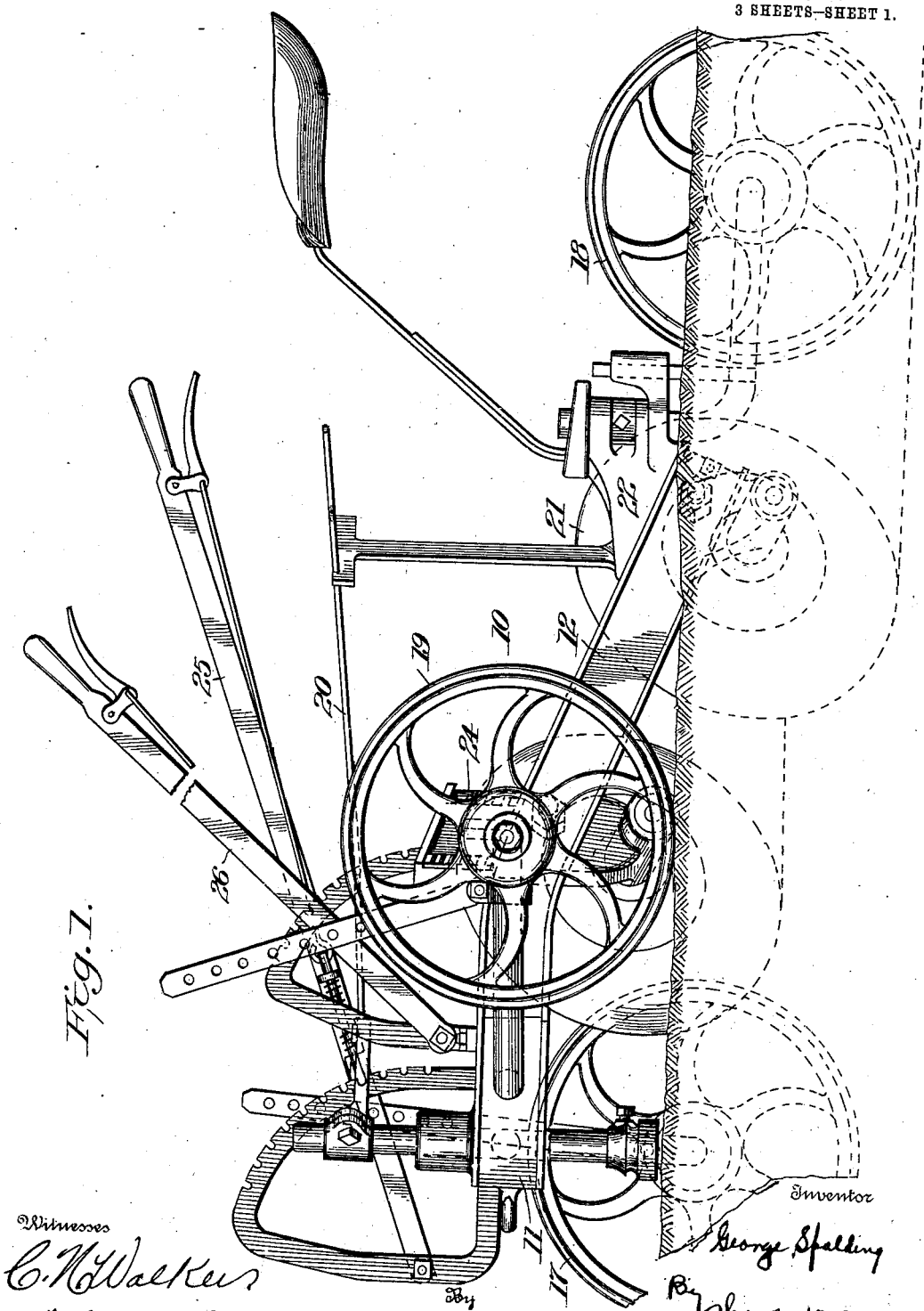

G. SPALDING.
FRAME FOR TILLING MACHINES.
APPLICATION FILED DEC. 30, 1908. RENEWED MAR. 1, 1911.
991,461.
Patented May 2, 1911.
3 SHEETS—SHEET 2.
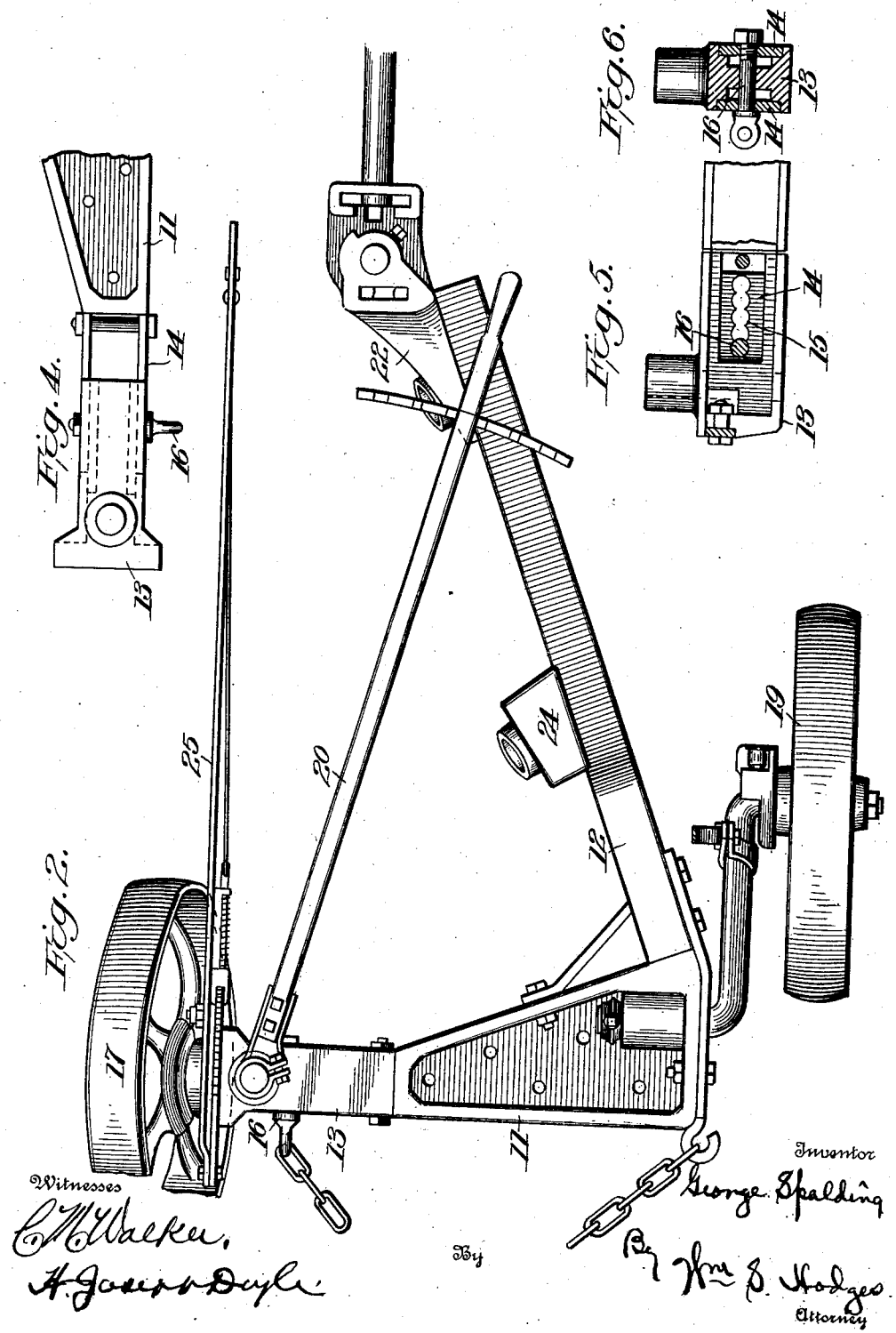

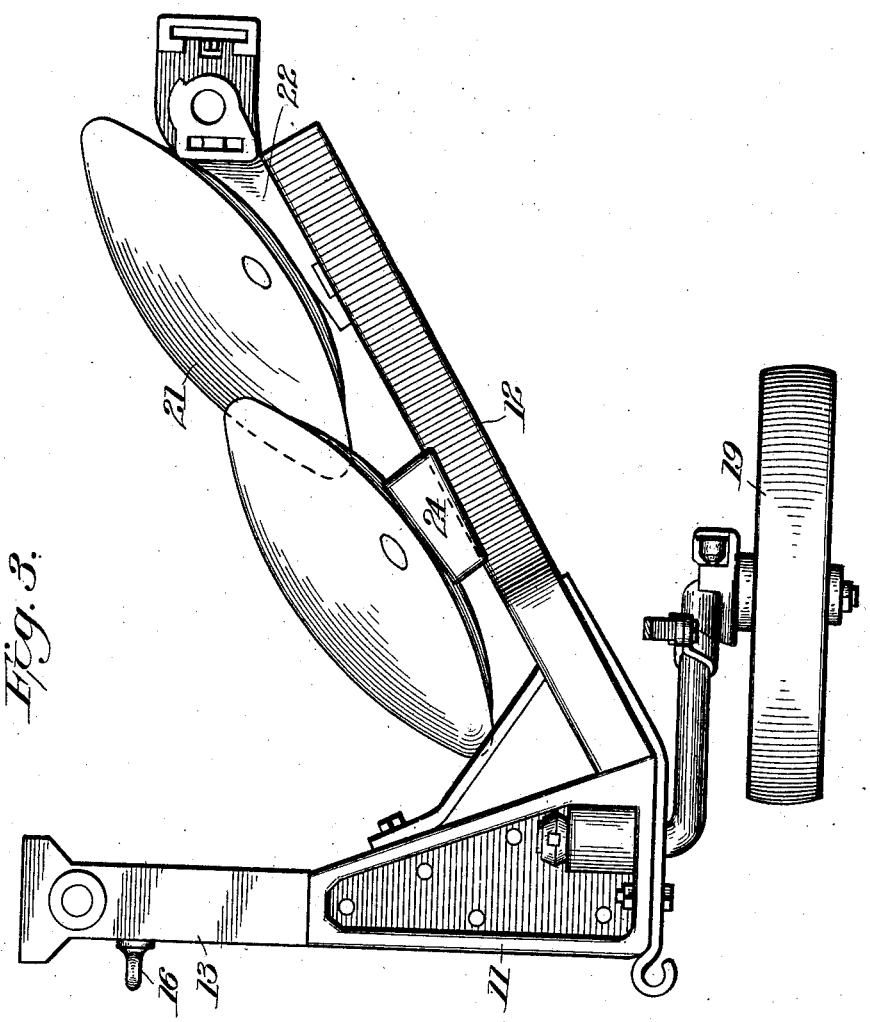

UNITED STATES PATENT OFFICE.

GEORGE SPALDING, OF STOCKTON, CALIFORNIA.

FRAME FOR TILLING-MACHINES.

991,461. Specification of Letters Patent. Patented May 2, 1911.

Application filed December 30, 1908, Serial No. 470,036. Renewed March 1, 1911. Serial No. 611,555.

*To all whom it may concern:*

Be it known that I, GEORGE SPALDING, of Stockton, in the county of San Joaquin, State of California, have invented certain new and useful Improvements in Frames for Tilling-Machines, of which the following is a specification.

This invention relates to certain new and useful improvements in tilling machines, wherein rotary disks are employed.

The present invention has for its object the production of a simple frame which is particularly adapted to afford ample clearance at the front and sufficient depth at the rear to secure the desired positions of the disks and overcome the twisting strains.

A further object is to provide a frame which, in addition to carrying the disks used, with their proper rearward inclinations, is depressed rearwardly so as to carry the disks when placed in their proper relative vertical positions, and deflected transversely to the line of draft so as to carry the disks when placed in their proper relative lateral positions.

A further object is to provide means whereby the width of the frame may be adjusted to correspond with differences in the widths of the furrows desired.

The invention will be hereinafter fully set forth and particularly pointed out in the claims.

In the accompanying drawings:—Figure 1 is a side elevation of my improved tilling machine illustrating the same in operation with the lower edges of the disks submerged. Fig. 2 is a top plan view thereof. Fig. 3 is a top plan view illustrating a slight modification to suit a different arrangement of the disks. Fig. 4 is a top plan view of the adjustable portion of the frame. Fig. 5 is a longitudinal sectional view thereof. And Fig. 6 is a transverse sectional view thereof.

Referring to the drawings, 10 designates my improved tilling machine, the frame of which is formed of two members 11, 12, the member 11 being arranged transversely to the line of draft, the member 12 being extended rearwardly and deflected downwardly from one end of member 11, and also arranged in a transverse vertical plane deflected laterally, as shown. The arrangement of the members 11 and 12 is such that they assume the approximate form in plan, of one side and a portion of the hypotenuse of a right angled triangle. In practice the member 11 is the front of the machine and the member 12 the "backbone." The member 11 is provided with an adjustable section 13 arranged to slide between plates 14 carried by said member 11 and provided with a plurality of holes 15 arranged to receive a bolt 16, whereby the length of member 11 may be varied to change the width of the frame and thus adjust it to differences in the width of the furrows and to suit varying conditions.

The frame 10 is supported upon furrow wheels 17, 18, and a land wheel 19 of any preferred construction and mounted in any suitable manner, the wheel 17 serving as a steering wheel controlled by lever 20. The rear disk 21 is carried by a member 22 rigidly secured to the rear end of the backbone 12, and the forward disk is carried by a standard 24 adjustably secured to said backbone in advance of member 22. The sides of the frame may be raised or lowered by suitable levers 25, 26, but the novel features involved in these levers and their appurtenances, the furrow wheels, steering mechanism, and disk mountings, form the subject matter of separate applications and are not specifically claimed herein.

The advantages of my improved frame will be readily apparent to those skilled in the art to which it appertains. It will be particularly noted that by providing the relatively high front and the rearwardly extended downwardly inclined backbone I have provided ample clearance for trash and the like, at the forward end, and have arranged the frame in such manner that the supports for the journals of the disks are close to the disks, thus presenting a maximum resistance to the twisting strains. At the same time by deflecting the rear end of the frame laterally or in a direction transverse to the line of draft, the successive disks are brought into their proper lateral relation, thereby avoiding undesirable adjustments. It will be noted in this connection that while I have illustrated and described my improved frame as particularly adapted for machines employing disks, I do not desire to limit myself in this respect, as it is obvious that other implements may be substituted for either or both of the disks without departing from the spirit of my invention.

One of the important advantages of a frame embodying my invention is that in the manufacture thereof, standard forms of material (bent and punched) may be employed.

In operation, the great capacity of my improved tilling machine is such with respect to the quantity of earth turned up in a single operation, that in heavy work where from two to six horses are required, when the disks encounter rocks, roots, or other obstructions, severe strains result. To meet these conditions the form of the frame is adapted, and its parts and the materials employed in its construction are so disposed as to best resist all of the strains, the frame remaining sufficiently rigid for all kinds of work.

I claim as my invention:—

1. In a tilling machine, a frame provided with a rigid backbone set with its axis in a vertical plane diagonal with relation to the line of draft, said backbone being deflected downwardly toward the rear end and provided with means for supporting a plurality of tilling devices on different horizontal planes.

2. In a tilling machine a frame formed of a front member arranged transversely to the line of draft, and a rigid backbone set with its axis in a vertical plane diagonal with relation to the line of draft, said backbone being deflected downwardly toward the rear end and provided with means for supporting a plurality of tilling devices on different horizontal planes.

3. In a tilling machine, a frame provided with a rigid backbone set with its axis in a vertical plane diagonal with relation to the line of draft, said backbone being deflected downwardly toward the rear end and provided with means for supporting a plurality of tilling devices on different horizontal planes, and means for adjusting the width of said frame.

4. In a tilling machine, a frame formed of a front member arranged transversely to the line of draft, and a rigid backbone set with its axis in a vertical plane diagonal with relation to the line of draft, said backbone being deflected downwardly toward the rear end and provided with means for supporting a plurality of tilling devices on different horizontal planes, and means for adjusting said front member to vary the width of said frame.

5. A frame for tilling machines having the approximate form in plan of the short side and a portion of the hypotenuse of a right angled triangle, said short side being located at the forward end of the frame, the long side being deflected downwardly toward the rear end and provided with means to support a plurality of tilling devices on different horizontal planes.

6. A frame for tilling machines formed of two members corresponding in position in plan, with the perpendicular and the hypotenuse of a right angled triangle, respectively, the shorter end of one of said members, when the machine is in operation, being at the forward end of the frame, elevated above and transverse to the furrow being plowed, the longer member being extended to the rear and deflected downward toward the rear end and provided with means to support a plurality of tilling devices on different horizontal planes.

In testimony whereof, I have signed this specification in the presence of two subscribing witnesses.

GEORGE SPALDING.

Witnesses:
   CHAS. E. RIORDAN,
   WM. S. HODGES.

---

Copies of this patent may be obtained for five cents each, by addressing the "Commissioner of Patents, Washington, D. C."